United States Patent [19]
Litten

[11] Patent Number: 5,871,109
[45] Date of Patent: Feb. 16, 1999

[54] RAILCAR CUSHION DEVICE PRELOAD VALVING SYSTEMS

[75] Inventor: Glen L. Litten, Springfield, Oreg.

[73] Assignee: Emerald Rail Technologies, LLC, Springfield, Oreg.

[21] Appl. No.: 714,553

[22] Filed: Sep. 16, 1996

Related U.S. Application Data

[63] Continuation-in-part of Ser. No. 692,172, Aug. 5, 1996.

[51] Int. Cl.$^6$ ........................................................ B61G 9/16
[52] U.S. Cl. ........................ 213/43; 188/287; 188/322.13; 137/514.7
[58] Field of Search ...................... 213/7, 8, 43; 188/269, 188/287, 312, 315, 322.13; 137/514, 514.5, 514.7

[56] References Cited

U.S. PATENT DOCUMENTS

| | | | |
|---|---|---|---|
| 3,621,875 | 11/1971 | Alexander | 137/514 |
| 3,797,673 | 3/1974 | Daugherty Jr. | 213/8 |
| 5,325,700 | 7/1994 | Litten | 73/11.06 |
| 5,415,303 | 5/1995 | Hodges et al. | 213/43 |
| 5,487,480 | 1/1996 | Page et al. | 213/43 |
| 5,603,348 | 2/1997 | Geringer | 137/514.7 |
| 5,642,823 | 7/1997 | Kalina et al. | 213/43 |

*Primary Examiner*—S. Joseph Morano
*Attorney, Agent, or Firm*—Klarquist Sparkman Campbell Leigh & Whinston

[57] ABSTRACT

A pressure relief valving system for a rail car cushion device including several preload valves mounted in the cylinder wall of the cushion device each having both spring biasing and hydraulic biasing applied to retain a valve piston against a seat until a preload pressure is reached, and each preload valve capable of transitioning from a closed mode to an open mode at a preset preload pressure.

31 Claims, 8 Drawing Sheets

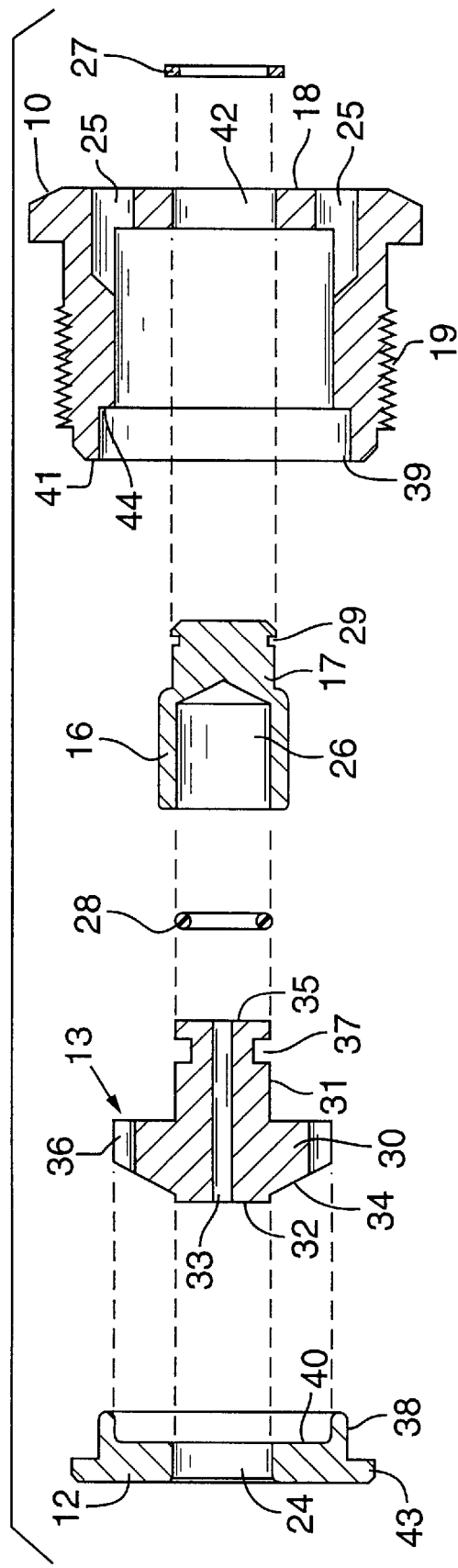

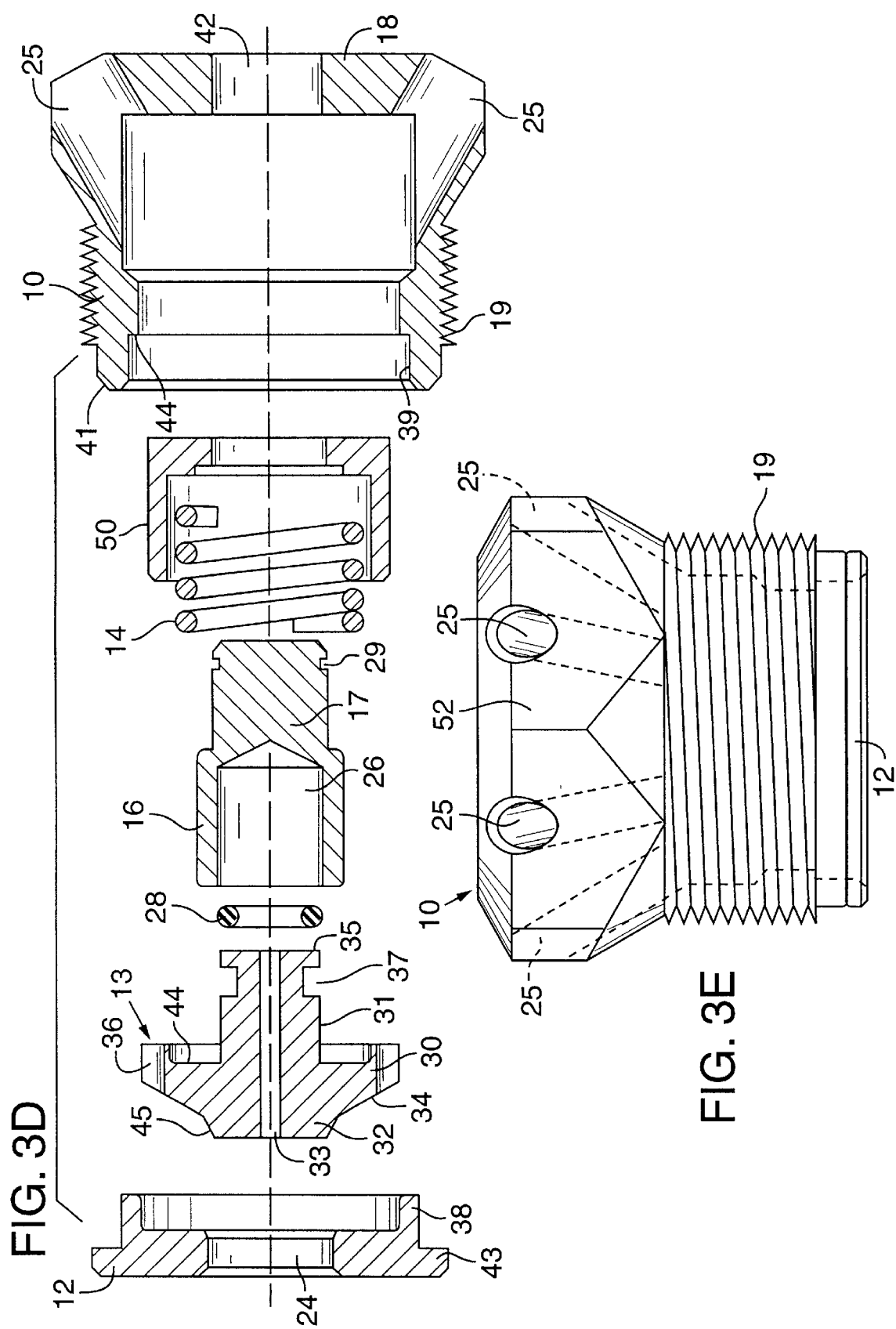

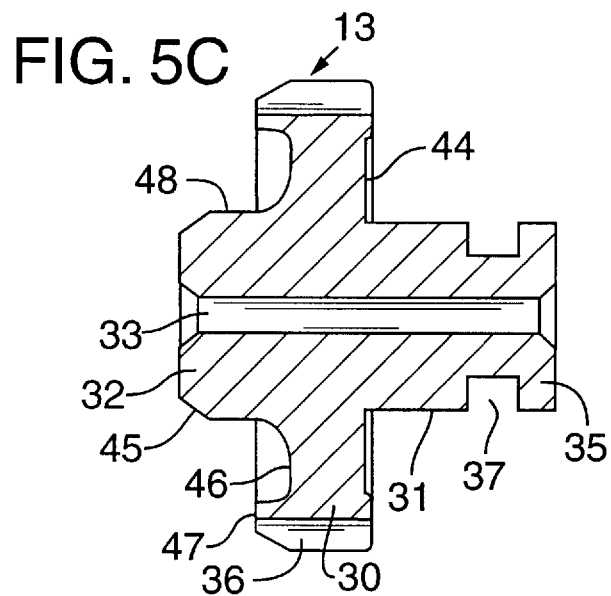
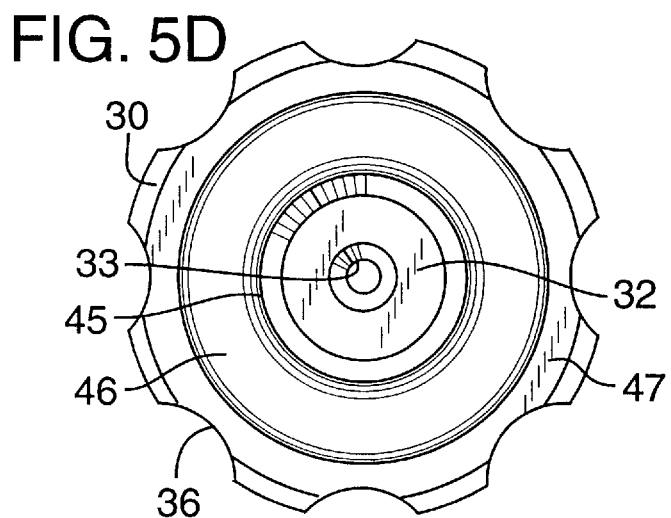
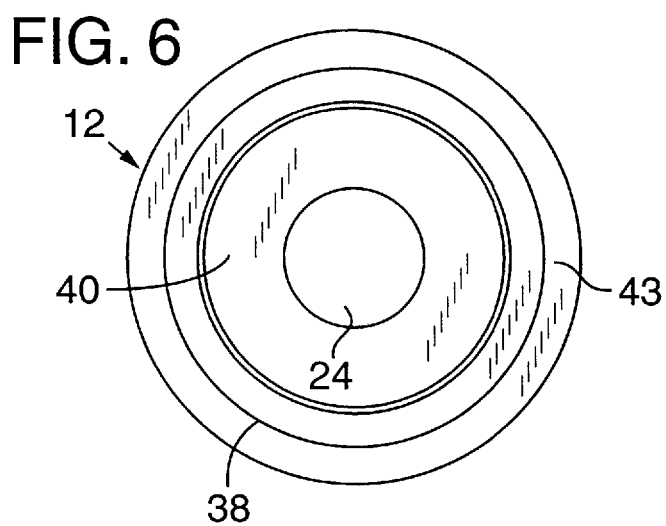

5,871,109

RAILCAR CUSHION DEVICE PRELOAD VALVING SYSTEMS

This is a continuation-in-part of co-pending U.S. application Ser. No. 08/692,172 filed Aug. 5, 1996 pending.

FIELD OF THE INVENTION

The invention relates generally to gas-charged hydraulic cushion units that are used to absorb shock impacts between rail cars during collisions, and in particular to cushion unit preload valving system for absorbing shock pressure loading at both high and low speed.

BACKGROUND OF THE INVENTION

Non-linear hydraulic shock absorbers are used in railroad cars to minimize damage from bumping and collisions and the units are referred to as cushion devices. During a 14 mile per hour collision between rolling stock weighing 220,000 pounds shock forces transferred to cushion devices can result in a rise in hydraulic fluid pressure to a peak of more than 1,200,000 pounds per square inch (psi) within just a few seconds. The very high peak pressures, combined with a wide range of operational shock absorbing create special engineering challenges. While it is necessary to rapidly release hydraulic fluid pressures in a cushion unit during high speed collisions to prevent an explosive failure, at lower speeds pressures build more slowly and if they are released too rapidly the railcar or its cargo can be damaged.

Typically rail car cushion devices mounted in rail cars (e.g., as disclosed in U.S. Pat. No. 5,325,700), are filled with hydraulic fluid. The cushion units are designed to absorb a constant force by using a piston to force hydraulic fluid through apertures spaced along the side walls of a central cylinder and into an annular space surrounding the circumference of the cylinder, i.e., between the casing and the cylinder. As the piston traverses the cylinder it progressively closes the apertures leaving fewer and fewer open. By varying the spacing along the cylinder wall an attempt has been made to create a relatively constant resistive force throughout the piston stroke. In railroad operation, forces applied to railcars during collisions are not necessarily linear or constant with respect to time. The piston is commonly returned to its original position by a spring or by charging the hydraulic fluid in the cushion device with nitrogen gas to a pressure of about 600 to 800 pounds psi. Typical cushion devices in the art suffer from the disadvantage that rapid shock force loading, even at a low total force, can result in damage to a railcar and cargo if hydraulic fluid escapes too rapidly through the apertures in the sidewalls of the cushion device cylinder.

Rail car collisions commonly occur at a variety of different speeds and involving different loads that can be more than 220–350 thousand pounds. Common rail car gas charged cushion devices are fabricated with either a 10-inch or 8-inch cylinder and piston, and with a 10-inch stroke. (An 8-inch diameter 15-inch stroke unit is currently under consideration for approval by the American Association of Railroads.) The two common 8- and 10-inch diameter units must currently accommodate all the different types of shock absorbing requirements encountered in normal railroad operations. Theoretically, pressure in a hydraulic cushion device is related to at least the area of the piston; the working area of the cushion device; the volume of fluid in the cylinder; the pressure of gas in the cylinder; the temperature of the fluid (e.g., heat generated from rapid fluid movement); the frictional forces in the device; the hydraulic fluid viscosity and the change in viscosity with temperature; the collision rate (i.e., velocity/time); the rail car mass; and, the variation in collision applied force(s) with time (i.e., a multi-equation, multivariate analysis). The analysis is further complicated, because in common cushion devices, as a shock absorbing piston traverses a cylinder it pushes hydraulic fluid through apertures and progressively closes the apertures that are available for release of pressure. Thus, while certain "educated" guesses have been made as to the number, position and size of apertures in hydraulic cylinder devices, usage has shown deficiencies resulting in both cargo damage, metal fatigue, and failure of cushion devices.

The inventor has disclosed test devices for railcar cushion devices, and parameters determining hydraulic damping coefficients in railcar cushion devices in U.S. Pat. No. 5,325,700 (incorporated herein by reference).

Service life of cushion units is varied, depending upon type of use, number of high impact collisions and the like. Moving parts are subject to wear, (e.g. seals), while the casing and metal parts are subject to corrosion and metal fatigue. Generally cushion units give several years of service before failing. Conventional cushion units are, unfortunately, a compromise that may absorb shock forces well at some collision velocities and within certain load limits, but may commonly fail at other velocities or loads. If satisfactory for higher speed higher mass collisions the units may be too "stiff" for lower speed or lower load collisions; and if satisfactory for lower speed lower load collisions too "relaxed" for higher speed/load collisions. Limitations in cushion devices restrict the types of railroad operations that may be conducted with railcars containing e.g., fragile cargo.

It is an object of the invention to provide cushion unit that are less of a compromise, and are capable of absorbing shock more uniformly over a wider range of operating conditions, loads and collision velocities.

SUMMARY OF THE INVENTION

Disclosed herein are preload valving systems for rail car cushion devices that release collision force hydraulic pressures over a range of preset pressures to accommodate a range of different normal operating conditions. Investigations of high pressure hydraulic fluid flow through a small 1-inch diameter piston-type pilot valve at pressures up to tens of thousands of pounds per square inch have resulted in preload valve designs and valving systems useful for rapidly and cleanly releasing very high peak hydraulic pressures without valve chatter, turbulence or failure. The preload valves are installed at different positions within the cylinder wall of a cushion device. The disclosed preload valving systems offer the advantage of providing shock absorbing capacity in collisions at low mass and low velocity, as well as at a high mass and high velocity.

BRIEF DESCRIPTION OF THE DRAWINGS

FIG. 3A depicts a side cutaway view of a first preload valve according to one preferred embodiment of the invention, as described further below.

FIG. 3B depicts an exploded view of the first preload valve of FIG. 3A.

FIG. 3D depicts an exploded view of the preload valve of FIG. 3C.

FIG. 3E depicts a plan side view of the preload valve of FIG. 3C and FIG. 3D.

FIG. 5C depicts a side cross-sectional view of an an alternative valve piston operative in the preload valve of FIGS. 3C–3E.

FIG. 5D depicts a plan view of the head portion alternative valve piston of FIG. 5C.

FIG. 6 depicts a plan view of the interior surface of a valve seat plate in the preload valve of FIGS. 3A–3E and FIGS. 5A–5B, above.

DETAILED DESCRIPTION OF THE PREFERRED EMBODIMENT

Figure 1:
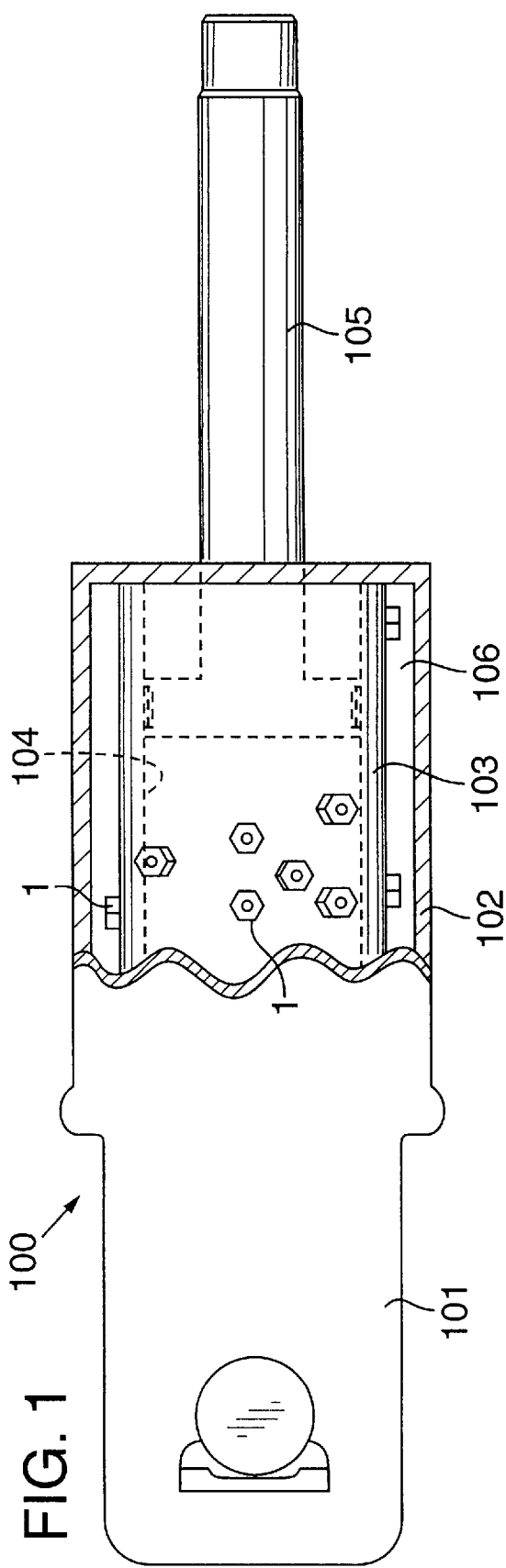
FIG. 1 depicts in a cutaway plan view an improved railcar cushion device fitted with preload valves according to the accompanying disclosure, below.

Experimentation at a special hydraulic test bench designed by the inventor, was used to identify critical elements in a preload valving system that would be capable of absorbing shock force pressure in a rail car cushion device under a range of different common operating collisions. The empirical experimental methods evaluated rapid pressure, i.e., in excess of tens of thousands of pounds per square inch (psi) in a few seconds. Prototypes were tested further for performance in a cushion device unit fitted to a railcar test unit (disclosed by the inventor in U.S. Pat. No. 5,325,700; incorporated herein by reference), that was specifically invented to measure and record dynamic changes in pressure in cushion devices including response rates and performance during collisions on a test track. Critical elements of a preload pilot-type valve system were determined to involve at least the following components: namely, (i) The size, shape, number and position of individual valves in the cylinder wall of the cushion device;

(ii) The shape and size of individual valve housings;

(iii) The size and shape of the valve piston heads (i.e., vortexing and non-linear fluid flow at high pressures were highly significant factors leading to valve chatter and failure);

(iv) The means for biasing a valve piston against its seat (i.e., both hydraulic fluid pressure-bias means and a spring-bias means were necessary to properly retain a piston against its seat; relying on only a high tensile strength helical compression spring resulting in metal fatigue and failure);

(v) The size, shape, number and radial orientation of entry and exit passages in a preload valve; and, (vi) The size and shape of internal chambers and exit passages within a valve.

Each of the former elements was tested, altered and optimized in a multivariate empirical analysis to obtain a valving system capable of retaining fluid during lower velocity and/or lower load collisions while rapidly and cleanly releasing pressures resulting from higher velocity and/or higher load collisions. In the analysis the size and shape of the entry and exit passages and internal chambers was altered and hydraulic "opening" forces (i.e., the collision force hydraulic pressure) balanced against the "closing" forces, i.e., the bias spring and hydraulic bias means (below), until a valve was obtained that was capable giving clean break-away hydraulic fluid flow at about 50,000 to about 100,000 psi. Having establishing the critical elements and design solutions provided according to the instant disclosure for optimal performance, skilled artisans will of course recognize that, (according to the accompanying disclosure), alterations may be made within the spirit and scope of the invention which may include changing the force applied by the spring bias means and hydraulic bias means, and the size of the entry and exit and interior passages.

Accordingly, it is an object of the invention to provide a preload valving system capable of absorbing shock pressure loading in a rail car cushion device operating within a range of common operating collisions by releasing pressure (i.e., as hydraulic fluid) at a variety of different predetermined and preset preload pressure release values and at different predetermined positions along the cylinder wall of a cushion device cylinder. By varying the positions and preload pressure ranges of the valves a flexible valving system is provided that is capable of accommodating a wide range of different collision velocities and loads.

In another object, the invention provides a preload valve having a predetermined hydraulic pressure value at which a piston is actuated opening the valve.

In yet another object, a preload valve is provided having a hydraulic biasing means and spring biasing means combining to set a predetermined hydraulic pressure value at which a piston is actuated to open the valve. The subject biasing means combine to force the valve piston against a seat until counter-balanced by the predetermined preload value of the hydraulic pressure in the cushion device.

In another object, the invention provides a preload valving system operating at preload pressures of about 50,000 psi to about 100,000 psi without turbulence that can cause valve chatter that can lead to valve failure.

In another object the invention provides a preload valving system installed in a rail car cushion device that confers upon the cushion device the capability to provide shock absorption capability during both lower mass (i.e., less than about 220,000 pounds gross railcar weight) and/or lower velocity collisions (i.e., less than about 6 miles per hour); and, higher mass (i.e., greater than about 220,000 pounds railcar gross weight) and/or higher velocity collisions (i.e., greater than about 6 miles per hour).

Embodiments of the invention provide valving systems capable of absorbing a variety of different collision force hydraulic pressures resulting from collisions over a speed range from about 1 mile per hour to about 20 miles per hour, and in railroad rolling stock having gross weights from about 100,000 pounds to about 350,000 pounds. Disclosed herein are a variety of different preload valves set to release hydraulic fluid pressure at a variety of different predetermined preset pressure values in cushion devices having different piston (and cylinder) diameters (and bore volumes). The subject preset pressure values determine the amount of resistive force applied to a cushion device piston as it traverses a cylinder. The inventor has previously disclosed position, velocity, force graphic profiles with time, for normal and damaged railcar cushion devices at FIGS. 12 and 13 (and accompanying disclosures) in U.S. Pat. No. 5,325,700 (incorporated herein by reference). The subject force graphic profiles mirror the resistive force within a cushion device as a function of the position of a cushion device piston, or its velocity of movement. The subject disclosure relates to force graphic profiles constituting a generally bell-shaped (although somewhat ragged) curve (i.e., rising somewhat linearly with time to a peak force and then falling). According to the present disclosure, the instant preload valving system is useful in constructing improved cushion devices that function to generate a variety of different force graphic profiles. For instance, below a set preload pressure hydraulic damping is accomplished by the cushion device cylinder and piston (below) without opening the instant preload valves. Thus, the force graphic profile for an improved cushion device fitted with the instant preload valves includes a rapid rise in force to a threshold (preset predetermine value- or values) at which point one or more preload valves open and the resistive force immediately falls, i.e., creating an instantaneous plateau on a force graphic profile. By combining preload valves that open at different predetermined preset pressure values it is possible to construct improved cushion devices functioning (when tested in the incorporated disclosure, supra) to produce a 'stairstep' graphic profile, i.e., including one or more convex rise portions in the force graphic profile to one or more relatively shallow plateau values, each being of a short duration. The subject improved cushion device with the instant preload valving system, thus functions to absorb collision forces in a series of controlled "surges" of resistive force applied by the hydraulic pressure in the cushion device.

In illustrated embodiments of the invention, preload valving systems are made up of a number of individual different preload valves mounted in apertures along the cylinder wall of a cushion device cylinder (as disclosed further below). The subject preload valves, so mounted to form the instant preload valving system, may all "open" (as defined below) at the same preload pressure, or may "open" at different preload pressures. In one presently preferred embodiment, the preload valves so mounted release hydraulic fluid at progressively greater pressures so that resistive force encountered by the cushion device piston is increasing in a stepwise manner as the piston traverses the cushion device from the proximal end to the butt end.

The subject valving systems are usefully installed in new (manufactured original equipment, OEM) and used (i.e., re-manufactured or repaired) cushion devices.

In one representative example the instant valving system is installed during rebuilding an existing used cushion device having a piston/cylinder diameter of about 8- to about 10-inches, and about 11 of the instant preload valves are mounted in special cavities machined into existing apertures in the subject cushion device. In this particular example, all of the subject valves are conveniently preset to a predetermined hydraulic pressure values: namely, to open at about 50,000 to about 100,000 pounds per square inch (i.e., psi), and most preferably about 60,000 pounds of hydraulic pressure (i.e., "preload" pressure, defined below), in the cushion device cylinder. In a second representative example of the instant valving system, installation is in OEM cushion devices and about 9 to about 15 of the instant valves are mounted in apertures in the wall of cushion device cylinder, e.g., at positions along a helical axis subscribed about the subject cylinder. Each of the instant valves may have the same preload value, e.g., about 50,000 to about 100,000 psi, or they may have different preload values, e.g., from about 15,000 psi at a proximal (coupler) end to about 150,000 psi at a distal (butt) end of the subject cushion device cylinder. The mounting positions of the instant preload pilot valves and preload pressures in an OEM (or re-manufactured) cushion device are preferably varied to achieve a desired result, which is to produce a cascade of valve openings as the subject cushion device piston is compressed into the hydraulic fluid of the cushion device cylinder. Skilled artisans will of course recognize that the number and preload pressures of the instant valves comprising the instant valving system may be varied to accomplish different shock damping (i.e., instant preload valves closed) and shock absorbing (i.e., instant preload valves open) response rates (e.g., according to the incorporated disclosure, supra) and graphic response profiles having different peak pressures.

Embodiments of the invention provide a relatively small preload valve for mounting in annular spaces in the wall of a central cylinder in a cushion device unit and in fluid communication on one side with the cylinder and on the other side with a space between the central cylinder and outer casing of a rail car cushion unit. The instant valve unit is preferably less than about 1½ inches in diameter to about ¾ inch in diameter, and most preferably about 1 inch in diameter.

Embodiments of the invention provide a hydraulic biasing means for the instant preload valve including a channel communicating through a valve piston shaft from the cylinder chamber in the cushion unit at the one end to a valve dashpot sealed by an O-ring at the other end. Fluid forced into the channel is expressed into the dashpot to force the valve piston against its seat (as disclosed further below).

Embodiments of the invention provide the instant preload valve having a size and shape of entry and exit passages in the instant valves; and, a size and shape of internal chambers and passages within the valves capable of effecting both a predetermined preset hydraulic pressure, and a pressure actuated release of fluid through the instant valve that is rapid, clean (i.e., without turbulence) and without valve piston chatter (as defined below).

At used herein the following terms are intended to have meaning as follows: namely, "Cushion device unit" is intended to mean a gas charged, or spring returnable, hydraulic railcar shock absorber unit. Cushion devices are known in the art and one representative example is disclosed in U.S. Pat. No. 5,325,700, incorporated herein by reference. Commonly, cushion device units have cylinder (and piston) diameters of about 8 inches to about 10 inches with the hydraulic pressure therein being uniformly distributed on the interior convex surface of the cylinder wall and piston faces. The subject cylinder wall has an area for the convex surface ($A_c$) according to the following formula: namely, $$A_c = 2\pi rh \qquad \text{[Formula I]}$$

Conversion of cylinder wall pressure from cushion unit "a" having a diameter$_a$ (e.g. 10-inch), stroke$_a$ (e.g. 10-inches) and a pressure "$P_a$" (e.g., 50,000 psi) to a cushion unit "b" having a diameter$_b$ (e.g., 8-inch), a stroke$_b$ (e.g., 10-inches) and a pressure "$P_b$" may be described by the following formula: namely, $$(\Delta r \, \Delta h) P_a = P_b \qquad \text{[Formula II]}$$

where $\Delta r = (radius_a/radius_b)$, and $\Delta h = (cylinder\ height_a/cylinder\ height_b)$. In the foregoing example, the conversion from 50,000 psi pressure in a 10-inch diameter cylinder ("a") to pressure in an 8-inch cylinder ("b") is $P_b = (50,000)(1.25) = 62,500$ psi. Cushion units with other diameters of piston and cylinder may of course be accommodated according to the instant disclosure.

"Preload" is intended to mean that the instant valving means has both a "closed" mode and a "open" mode and that the transition from the closed mode to the open mode occurs at a "predetermined preset pressure value" of the hydraulic fluid within the cylinder of the hydraulic gas charged cushion device. In the closed position hydraulic fluid is retained within the hydraulic cushion device cylinder and cannot exit through the instant valving means. In the open position, hydraulic fluid within the hydraulic cushion device cylinder can exit through the instant valving means into the circumferential annular space afforded between the casing and the cylinder (FIG. 1, as disclosed below). In a presently preferred embodiment the "predetermined pressure" at which transition from the closed to the open mode occurs is about 50,000 psi to about 100,000 psi for a cushion device having a piston diameter of about 8 to about 10 inches in diameter, and most preferably about 60,000 psi.

"Closed mode" is intended to mean that the instant preload valve, when in this mode, does not allow hydraulic fluid to pass through its housing from the cushion device cylinder bore into the cushion device circumferential annular space.

"Open mode" is intended to mean that the instant preload valve, when in this mode, allows hydraulic fluid to pass through its housing from the cushion device cylinder bore into the cushion device circumferential annular space.

"Shock damping" is intended to mean the resistive force applied to a cushion device piston when a preload valve is in a closed mode, as defined above.

"Shock absorption" is intended to mean the resistive force applied to a cushion device piston when a preload valve is in an open mode, as defined above.

"Valve chatter" is intended to mean repetitive rapid opening and closing of a preload valve at a fixed test pressure. An example of valve chatter is provided by rapid movement of a preload valve piston to and from its seat at a fixed test pressure in excess of the subject valve's preset preload pressure.

"Valving means" is intended to mean one or more of the instant preload valve units installed in the cylinder wall of a railcar cushion device unit according to the instant disclosure. Preferably, about 9 to about 11 valve units are mounted in the cylinder wall of a railcar cushion device unit to obtain a preload of about 50,000 psi to about 100,000 psi, preferably about 60,000 psi.

"Mounting means" is intended to mean an element capable of retaining the valving means in an aperture in a cylinder wall of a railcar cushion device. Representative mounting means include threads, locking rings, welds, cover/retaining plates with bolts threaded into the cylinder of the cushion unit, and the like.

"Hydraulic fluid pressure-bias means" is intended to refer to means by which hydraulic fluid pressure within a rail car cushion device cylinder is channeled through passages in the piston of the instant preload valve to effect a biasing and damping of motion of the subject valve piston against its seat (as disclosed further below).

"Spring-bias means" is intended to mean a helical compression spring mounted within a preload valve according to the instant disclosure and capable of biasing a piston against its seat in the subject preload valve.

"Preload valve" is intended to mean a valve that remains closed until the pressure in the hydraulic cylinder rises into the range of predetermined pressure values at which the subject preload valve is preset to transition from the "closed" mode (i.e., supra, e.g., sealed against its seat) to the "open" mode (supra), e.g., about 50,000 psi to about 100,000 psi, above.

"Apical end", when used in regard to a cushion device or a cushion device cylinder, piston or casing, is intended to mean the end closest to the rail car coupler when the subject cushion device is installed in an operational manner in a rail car. When used in regard to the instant preload valve, apical is intended to mean that portion of the subject element that is located toward valve seat plate 12 i.e. away from housing base 18.

"Distal", or "butt", are used interchangeably in regard to a cushion device or a cushion device cylinder, piston or casing, is intended to mean the end furthest away from the rail car coupler, i.e., the end located toward the middle of a rail car, when the subject cushion device is installed in an operational manner in a rail car.

"Basal" when used in regard to the instant preload valve, is intended to mean that portion of the subject element that is located toward housing base 18 i.e. away from valve seat plate 12.

FIG. 1 schematically depicts in cutaway plan view a railcar cushion device 100.

Figure 2:
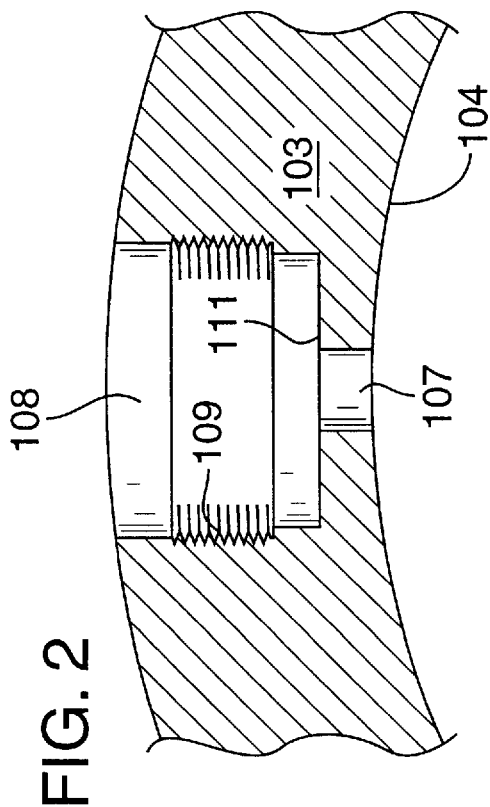
FIG. 2 depicts a cross-sectional side view of a portion of cylinder wall of the cushion device of FIG. 1 machined to receive a preload valve.

FIG. 2 depicts a cross-sectional side view of a portion of cylinder wall 103 of the cushion device of FIG. 1.

Railcar cushion device 100 has coupling 101 (i.e., to a railcar coupler) and an external casing 102 enclosing a cylinder wall 103 with a cylinder bore 104 in which a cushion device piston 105 is slideably retained by seals. A circumferential annular space 106 surrounds the exterior of cylinder wall 103 and is bounded by the interior of casing 102. Cylinder wall 103 contains several apertures 107 (FIG. 2) allowing fluid communication between cylinder bore 104 and aperture cavities 108; each aperture cavity 108 having a cavity step 111. (Further details of cushion device units are disclosed by the inventor in U.S. Pat. No. 5,325,700, e.g. at FIG. 1 and accompanying disclosure, incorporated herein by reference.)

Aperture cavity 108 (FIG. 2) is capable of receiving and retaining a preload valve 1 valve housing 10 and may have a mounting means for retaining the valve housing 10 within aperture cavity 108, e.g., threaded wall 109 for receiving e.g. valve housing 10 threads 19 (FIG. 3A, below).

FIG. 3A depicts a side cutaway view of a first preload valve according to a preferred embodiment of the invention.

FIG. 3B depicts an exploded view of the first preload valve of FIG. 3A.

Figure 3C:
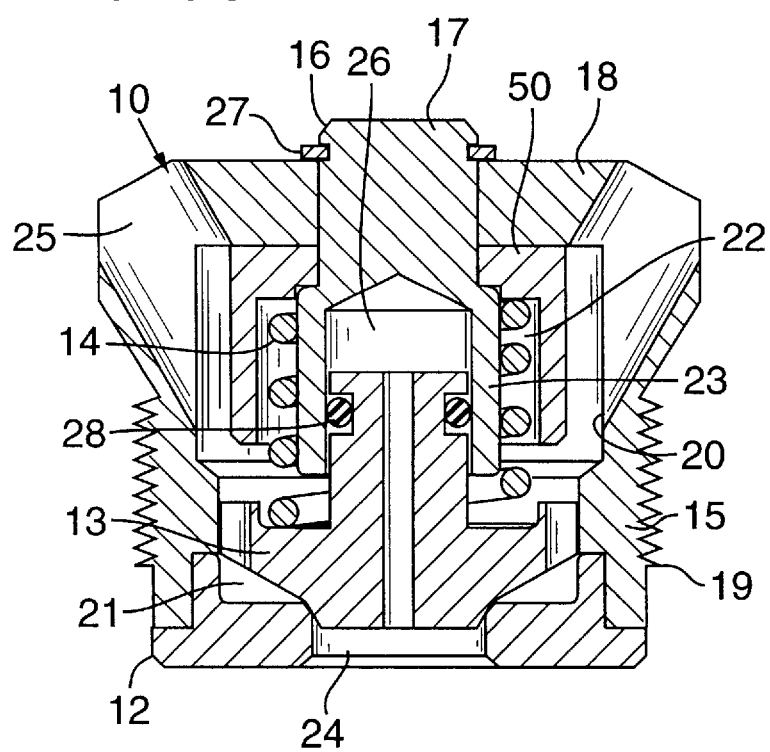
FIG. 3C depicts a side cutaway view of a second preload valve according to embodiments of the invention.

FIG. 3C depicts a side cutaway view of a second preload valve according to a most preferred embodiment of the invention.

FIG. 3D depicts an exploded view of the preload valve of FIG. 3C.

FIG. 3E depicts a plan view of the preload valve of FIGS. 3C–D.

According to a first and preferred embodiment, preload valve 1 (FIGS. 3A–3B) includes a cylindrical valve housing 10 having housing wall 15 enclosing valve piston 13 and bias spring 14. At one end, housing 10 has a recess portion 39 for receiving removable valve seat plate 12. At its other end, housing 10 has a housing base 18. The interior housing wall 20 (i.e., of housing wall 15) is preferably smooth (e.g., about a #16 finish) for receiving valve piston 13 and bias spring 14. Valve housing 10 also includes opening 42 in base 18 for receiving piston rod chamber 16 (depicted in exploded view in FIG. 3B).

According to a second and presently most preferred embodiment, preload valve 1 (FIGS. 3C–3E) includes the components of the preload valve according to FIGS. 3A–3B, supra, and (i) spring support sleeve 50 (FIGS. 3C–3D); and, (ii) housing exit passages 25 at the apical (rather than basal) end of spring orifice cavity 22. Exit passages 25 traverse housing 10 diagonally from the apical end of spring support sleeve 50 to find openings in hex head facets 52 (FIGS. 3C, 3E and 4B) in housing base 18.

The periphery of the exterior of housing wall 15 has a mounting means for retaining valve housing 10 in cavity 108 of cushion device cylinder wall 103, e.g., threads 19 (FIGS. 3A–3B; 3C–3E) capable of engaging threads 109 in cushion device cylinder wall 103 (FIG. 2). When installed in cushion device 100 cylinder wall 103 valve seat plate 12 (FIGS. 3A–3E) is engaged against cavity step 111 (FIG. 2). Preferably, when fastened within cavity 108 the face of valve seat plate 12 is sealed to within less than about 0.008-inches of cavity step 111.

Cushion devices 1 having differing diameters of pistons 105 and cylinder bores 104 may of course be accommodated according to the instant invention.

Figure 4A:
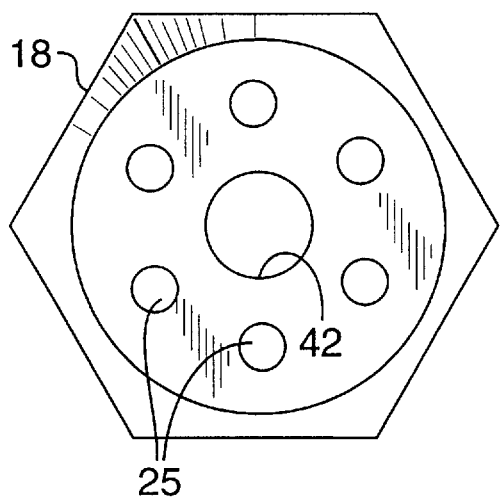
FIG. 4A depicts an exterior view of the housing base for the preload valve depicted in FIGS. 3A and 3B.

FIG. 3B depicts an exploded view of a first preload valve 1 showing the positional relationships (from left to right) between the following subcomponent elements: namely, valve seat plate 12; valve piston 13; valve piston rod seal 28; piston rod chamber 16; and housing 10. Describing next the individual features of each component, valve seat plate 12 has passage 24, and when preload valve 1 is install in cushion device 100 cavity 108 passage 24 is in fluid communication through aperture 107 with cylinder bore 104. When installed in cavity 108, the face of valve seat plate 12 (i.e., to the left in FIG. 3B) is in sealed contact along the exterior-side of a radial shoulder portion 43 of preload valve seat plate 12 with cavity step 111 (FIG. 2). On its opposite (interior-side), shoulder portion 43 is in sealed contact with a lip portion 41 in valve housing 10 (FIGS. 3B and 3D), and lateral movement of the valve seat 12 in relation to housing 10 is restricted by valve seat tongue portion 38 which engages the lateral walls 39 of a recess in the interior of housing 10. Features of the base of preload valve housing 10 of FIGS. 3A–3B are depicted in FIG. 4A showing the positions of opening 42 for receiving piston rod chamber 16 in relation to six radial hexagonally aligned exit passages 25.

Figure 4B:
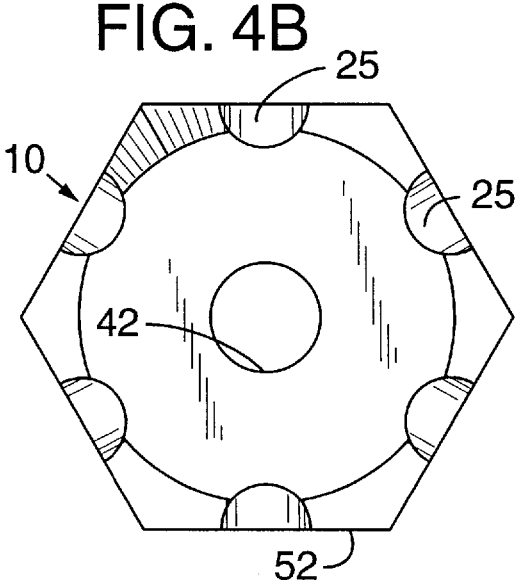
FIG. 4B depicts exterior view of the housing base for the preload valve depicted in FIGS. 3C–3E.

FIG. 3C depicts an exploded view of a second, and presently most preferred, preload valve 1 showing the positional relationships (from left to right) between the identical subcomponents of FIGS. 3A–3B, but with the additional most preferred differences. Namely, the preload valve depicted in FIGS. 3C–3E contains spring support sleeve 50 to stabilize bias spring 14 preventing collapse and allowing the possible use of a more resilient spring 14 having a faster response time and smaller structural modulus. When assembled, spring support sleeve 50 is trapped into position between the base of piston rod chamber 16 and the interior floor of housing base 18. The interior wall of sleeve 50 and the exterior wall of piston rod chamber 16 subscribe spring orifice cavity 22. Features of the base of preload valve housing 10 of FIGS. 3C–3E are depicted in FIG. 4B showing the positions of opening 42, for receiving piston rod chamber 16, in relation to six radial hexagonally aligned exit passages 25 milled into facet faces 52 (FIG. 3E).

Referring to FIGS. 3A–3E and FIGS. 5A–5B, piston 13 has the following elements: namely, piston head 30 and piston rod 31. Piston head 30 preferably has a cap portion 32, that in closed mode (supra) engages against the interior-face of valve seat 12; a piston passage 33, that operates in the hydraulic biasing means for piston 32 (i.e., according to the accompanying disclosure); and, a piston head tapered plane portion 34, i.e., acting in open mode to direct hydraulic fluid to the periphery of head 30 (as disclosed further below). Piston rod 31 preferably has a piston rod base 35 and a recess 37 for receiving seal 28. Seal 28 is preferably an O-ring-type seal and serves the function of slideably retaining and sealing piston rod 31 within piston rod chamber 16. When preload valve 1 is assembled, the basal surface of piston cap 30 engages one end of bias spring 14 (FIG. 3A, 3C–3D; not depicted in FIG. 3B) and the lateral interior surfaces of bias spring 14 are movably retained between the exterior surface of piston rod chamber 16 and interior housing wall 20 (FIG. 3A). or within spring support sleeve 50 (FIG. 3C). In the preferred embodiment depicted in FIGS. 3C–3D, the basal portion of piston cap 30 preferably has spring seat recess 44 for receiving one end of bias spring 14.

Piston travel is limited by bias spring 14, preferably to a piston travel of about 0.180-inches. The amount of piston travel serves to define the maximal volume (TABLE 3, below) of piston head cavity 21 (supra; FIGS. 3A, 3C). The diameter and height of piston passage 33 serves to define a volume (TABLE 3) that is determinative of the hydraulic biasing means (supra), i.e., the hydraulic pressure force applied against piston rod base portion 35. In a presently preferred embodiment for installation in a cushion device having a piston diameter of about 8 inches to about 10, inches piston passage 33 has a diameter of about $\frac{1}{16}$-inch (i.e., 0.062-inches), and bias spring 14 is a helical compression spring having about four 0.082-inch diameter (i.e., structural modulus) coils, and exerting a maximum biasing force of about 28 pounds within a maximum deflection of about 0.116 to about 0.180-inches (TABLE 2, below).

Piston rod chamber 16 (FIGS. 3B, 3D) has an inner piston biasing dashpot 26 that (when assembled) is in fluid communication through piston passage 33, valve seat plate passage 24, and cushion device cylinder wall aperture 107 with cylinder bore 104. The lateral walls of dashpot 26 slideably engage seal 28 thereby slideably retaining piston 13 within piston rod chamber 16. In optional embodiments, piston rod chamber 16 may be integral with the base portion 18 of housing 10 (e.g., milled- or cast- into the housing base), but in the particular embodiment depicted in FIG. 3B and FIG. 3D chamber 16 slideably engages into opening 42 in housing base 18 and is fixedly retained in place by engaging optional retainer 27 (e.g. a circlip-type retainer) into retainer recess 29. (In the absence of retainer 27, screwing the valve housing tightly into the cushion device cavity is effective to retain all of the constituent preload valve elements within housing 10.) In addition to opening 42, housing base 18 contains exit passages 25 (FIGS. 4A, 4B) that allow free escape of hydraulic fluid from within valve housing 10 into cushion device circumferential annular space 106 (FIG. 1).

FIG. 4A depicts an exterior plan view of the housing base 18 of the preload valve of FIGS. 3A and 3B, showing the central orientation of opening 42 and the radial relationship of exit passages 25. FIG. 4B depicts an exterior plan view of the housing base 18 of the preload valve of FIGS. 3C–3E. The particular embodiment illustrated in FIGS. 4A and 4B depict six hexagonally arranged exit passages 25, but in other alternative embodiments other orientations and numbers of exit passages 25 are envisaged according to the general benchmarks disclosed in regard to TABLE 3, below.

Figure 5A:
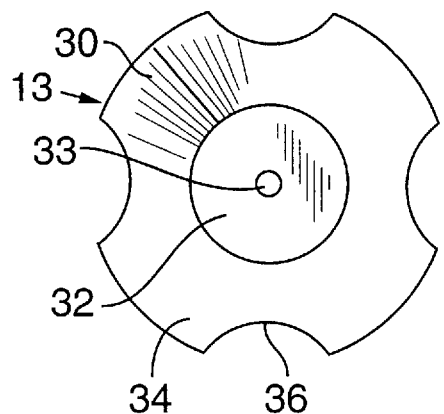
FIG. 5A depicts a plan view of the head portion of the valve piston operative in the preload valve of FIGS. 3A and 3B.
Figure 5B:
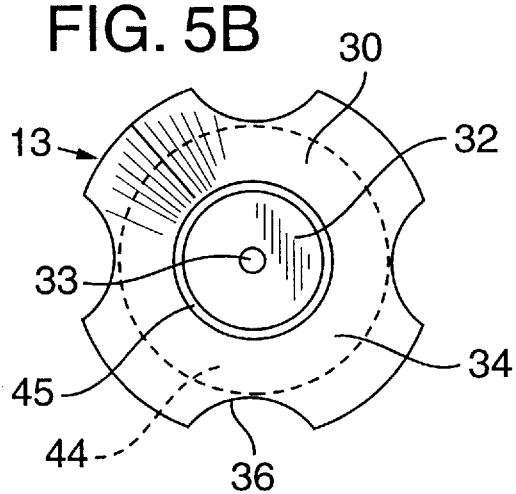
FIG. 5B depicts a plan view of the head portion of the valve piston operative in the preload valve of FIGS. 3C–3E.

Further details of piston head 30 are depicted in FIGS. 5A–5D. An illustrative plan view of the valve piston 13 of FIG. 3A is depicted in FIG. 5A, and piston 13 of FIGS. 3C–3E is depicted in FIG. 5B. An alternative, and presently most preferred, piston operative in the valve of FIGS. 3C–3E is depicted in FIG. 5C and FIG. 5D. The most preferred piston 13 is depicted in side cross-sectional view in FIG. 5C, and the head portion of which is depicted in plan view in FIG. 5D.

In preferred embodiments, piston head 13 has flat cap portion 32 having passage 33 communicating with dashpot 26. Cap portion 32 is capable of engaging valve seat plate 12 to seal passage 24 (FIGS. 3A–3D); and transitions at 90-degrees (i.e., to the horizontal axis of piston 13) to a circular tapered plane portion 34. The presently preferred piston 13 depicted in FIGS. 3D and 5B also has cap portion 32, but transitions to the tapered plane portion 34 at an angle of about 61-degrees (rather than 90-degrees).

The presently most preferred piston 13 (FIGS. 5C–5D) has a cap portion 32 with a tapered edge portion 45 that makes an angle of about 28-degrees to about 29-degrees relative to the horizontal axis of piston 13. The latter cap edge 45 transitions into a cap wall portion 48 that is parallel to the long axis of piston 13. At its base, cap wall portion 48 is curved forming the interior curvature of whirlpool recess 46 (FIG. 5C). The function of the latter interior curvature of whirlpool recess 46 is to direct hydraulic fluid entering the valve at very high pressures to enter into a whirlpool vortex that is circulating from the interior (i.e., toward the valve centerline) toward the exterior in recess 46.

In closed mode for preload valve 1, piston 13 head 30 cap 32 (supra) is in fluid communication (i.e., through passage 24) with hydraulic fluid in cylinder 103 of cushion device 100 (FIG. 1). The subject piston head design is capable of opening cleanly, i.e., without valve chatter at about 50,000 psi to about 70,000 psi, preferably at about 60,000 psi. The function of the respective piston head portions is disclosed further below.

In a preferred embodiment, piston head is integral with a cylindrical piston rod 31. Rod 31 has on its lower lateral portion a recess 37 for receiving seal 28, e.g., an O-ring. Piston rod base 35 forms a movable upper boundary of dashpot 26; having at its rod center piston passage 33. Hydraulic fluid flowing through passage 33 applies pressure within dashpot 26 that biases the piston rod base 35 (and piston 13) toward valve seat 12. Piston rod base 35 is preferably flat, with a 45-degree charnper into piston passage 33, although conical and other shapes that minimize turbulence in dashpot 26 may also be acceptable.

FIG. 6 depicts a plan view of the interior surface of the valve seat plate 12 of FIGS. 3A–3D, above.

Valve seat passage 24 is aligned to coincide with aperture 107 in cylinder wall 103 (FIGS. 1–2) and with piston head cap portion 32 and channel 33 (FIGS. 3A–3E, 4A–4B, above). The slope of tapered plane portion 34 of the piston head 30, and the size and orientation of convex passage portions 36 were found effective to cleanly direct high pressure hydraulic fluid flow to the radial periphery of the piston, around the edge of the piston head and down spring orifice 22; with minimal turbulence and without piston valve chatter.

Figure 7A:
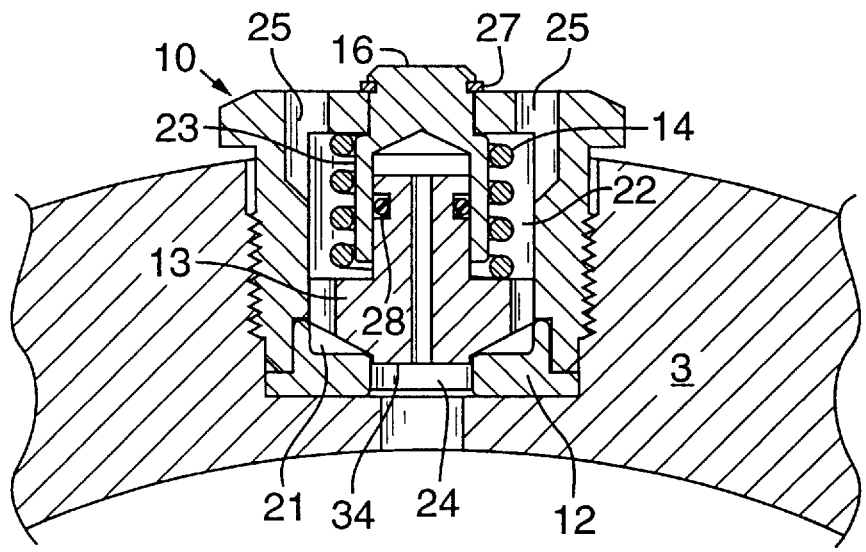
FIG. 7A depicts a side cross-sectional view of the preload valve of FIGS. 3A–3B in closed mode.

FIG. 7A depicts preload valve 1 of FIGS. 3A–3B in closed mode.

Figure 7B:
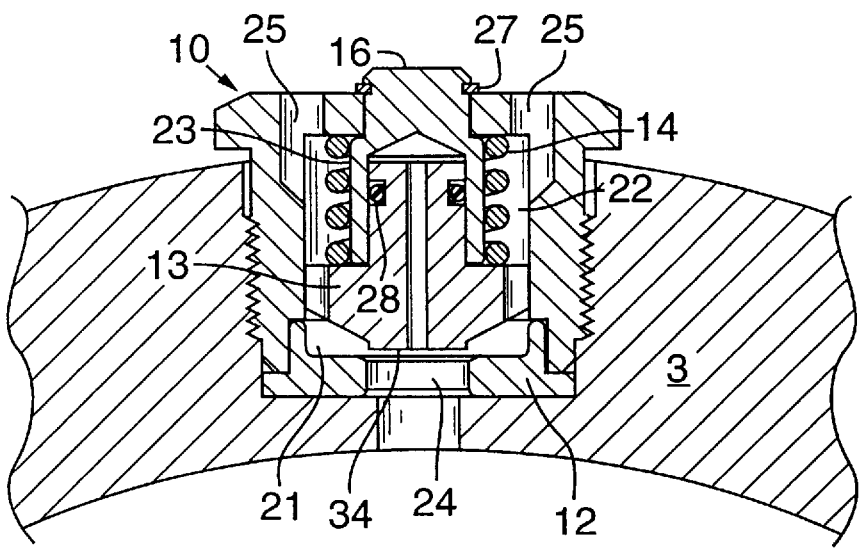
FIG. 7B depicts a side cross-sectional view of the preload valve of FIGS. 3A–3B in open mode.

FIG. 7B depicts preload valve 1 of FIGS. 3A–3B in open mode.

Figure 7C:
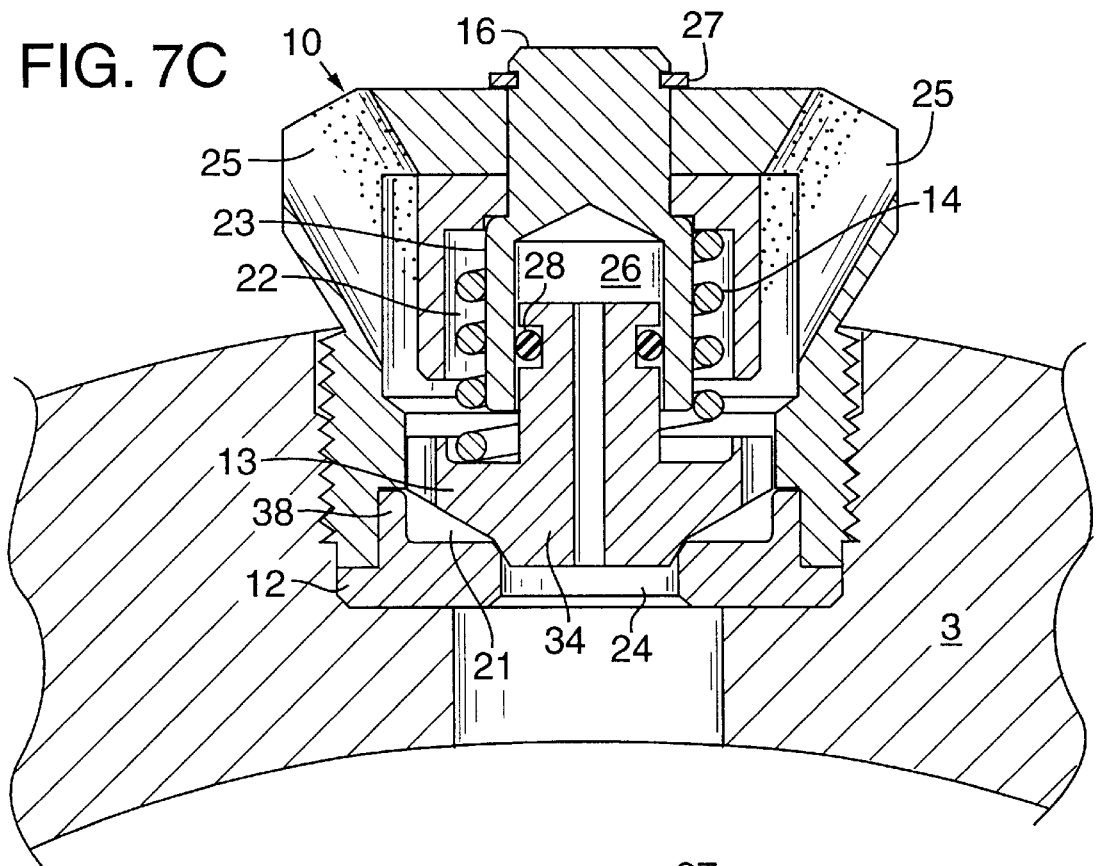
FIG. 7C depicts a side cross-sectional view of the preload valve of FIGS. 3C–3E in closed mode.

FIG. 7C depicts preload valve 1 of FIGS. 3C–3E in closed mode.

Figure 7D:
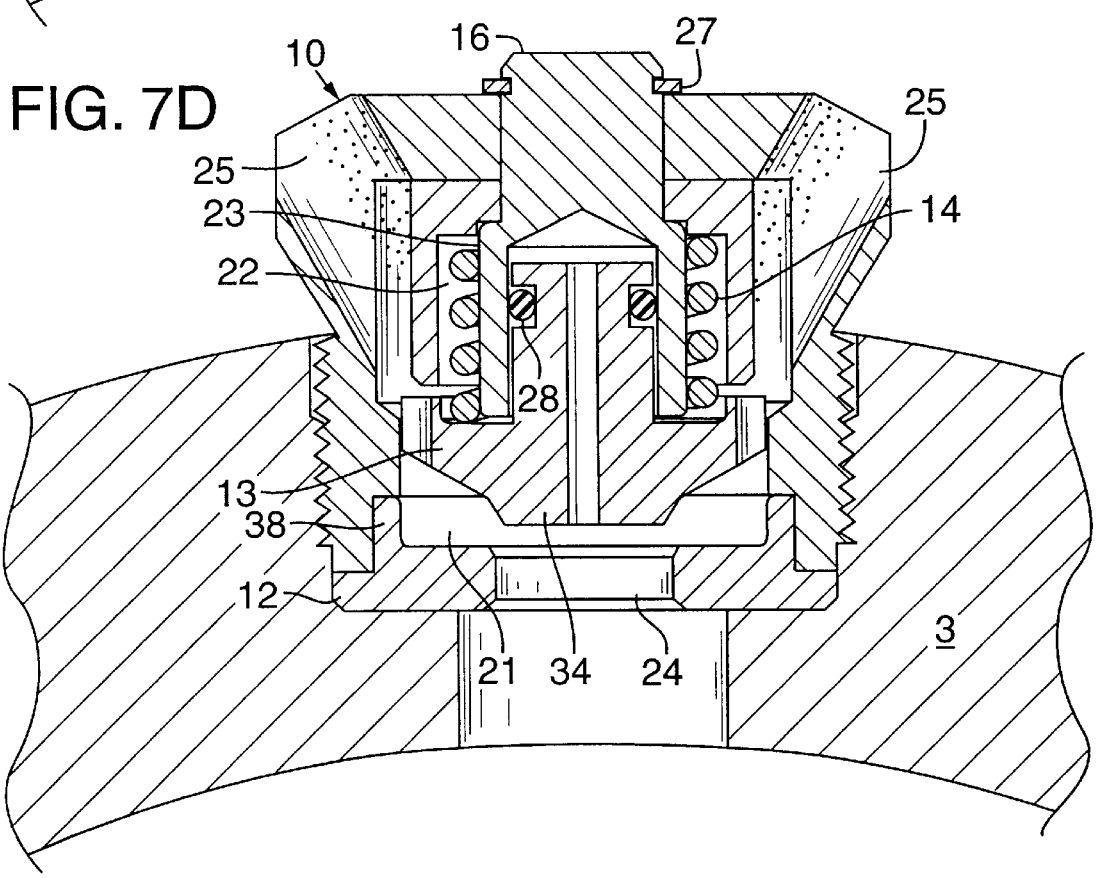
FIG. 7D depicts a side cross-sectional view of the preload valve of FIGS. 3C–3E in open mode.

FIG. 7D depicts preload valve 1 of FIGS. 3C–3E in open mode.

Referring to the passage of hydraulic fluids through valve housing 10, when the valving means is in a "closed" mode (FIG. 7A) the entry of fluid is partially restricted by the head cap 32 of valve piston 13. However, fluid is able to flow through passage 33 in valve piston 13 into dashpot 26. Valve piston 13 is retained against valve seat plate 12 by bias spring 14 and by the pressure from hydraulic fluid flowing into dashpot 26.

In "open" mode (FIGS. 7B; 7D), fluid from cushion device 100 enters valve housing 10 through aperture 107 in cylinder wall 103 of cushion device 100 (FIGS. 1–2). Aperture 107 is in fluid communication with valve seat plate passage 24. In closed mode (FIG. 7A), passage 24 is in communication with piston head cap 32 (FIGS. 3A; 3C.) In open mode (FIG. 7B), passage 24 is in communication with piston head cavity 21 (FIGS. 3A; 3C.) In open mode, valve piston 13 has a number of peripheral radial convex passage portions 36, preferably four, (FIGS. 5A; 5B), and most preferably eight (FIGS. 5C; 5D), through which fluid can escape, i.e., around the periphery of piston head 30 into spring orifice 22 (FIGS. 3A; 3C.) Spring orifice 22 is in fluid communication with a number of exit passages 25 leading to the circumferential annular space 106 in cushion device 100 (FIGS. 1–2.) The number and location of exit passages 25 may vary depending upon intended use of the instant preload valve in a cushion device (e.g., dependent upon at least the desired preset pressure value, the number of valves to be used in a cushion device and the intended load range of the railcar into which the cushion device is to be installed.) In one embodiment (FIGS. 3A–3B, supra) six exit passages 25 are radially arranged (FIG. 4A) in housing base 18. In a presently most preferred embodiment, six exit passages 25 are provided (FIGS. 3C–3E; FIG. 5B), allowing hydraulic fluid to pass diagonally through housing 10 to the exterior surface of hex head facet faces 52 in the base 18 of valve housing 10. In the embodiment of FIGS. 3C–3E, exit passages 25 communicate with the apical portion of spring orifice cavity 22. In the embodiment of FIGS. 3A–3B, exit passages 25 communicate with the basal portion of spring orifice cavity 22.

Referring to FIGS. 7A–7D, the following discloses a presently preferred method by which the instant preload valve operates to accomplish the objects of the invention, In closed mode, head portion 30 of piston 13 is biased against the interior surface of valve seat 12 (FIGS. 3A–3E; FIG. 6) by spring bias means 14 and hydraulic bias means operative through piston passage 33. It is preferred that both hydraulic and spring bias means shall combine to force the piston against its seat, i.e., valve seat plate 12 until a preload pressure value is reached within bore 104 of cushion device 100. When biased against seat 12, valve piston 13 is effective to restrict the flow of hydraulic fluid through passage 24. As preload valve 10 transitions from closed mode to open mode, valve piston 13 moves from an apical position toward a basal position, i.e., in the direction of housing base 18. As piston 13 moves from closed to open, piston head cavity 21 increases toward a maximal size allowing access of hydraulic fluid to radial piston convex passages 36. The subject fluid flows down the tapered plane 34 portion of piston 13 (FIGS. 3E; 5B), or into whirlpool recess 46 (FIGS. 5C; 5D), then through passages 36 and around the periphery of piston head 30. The subject transiting fluid gains access to spring orifice 22 and exits the valve housing 10 at housing exit passages 25 located either at the base of spring orifice 22 (FIGS. 3A–3B; FIG. 4A), or alternatively, in a presently most preferred embodiment, the subject fluid gains entrance to exit passages 25 at the apical portion of spring orifice 22 with exit from the valve being at six passages in hex facet faces 52 of base 18. Apical entry to passages 25 is presently preferred to (a) reduce the hydraulic forces applied to bias spring 14, and (b) to decrease possible turbulence that might occur at high pressures within spring orifice 22. In a presently preferred embodiment housing 10 contains six exit passages 25 (FIGS. 4A; 4B), although other numbers and sizes of exit passages are envisaged and considered to fall within the scope and spirit of the instant invention.

In preferred embodiments of the invention, spring bias means 14 and hydraulic bias means are selected such that at a predetermined preset preload hydraulic pressure value preload valve 1 transitions from closed mode to open mode. The combined actions of spring bias means 14 and the hydraulic bias means function to (i) reduce valve chatter (as defined supra); (ii) extend life of bias spring 14; and, (iii) assure clean (i.e., non-turbulent) opening of valve 1 by smooth withdrawal of piston head cap portion 32 from valve seat 12. In a presently most preferred embodiment piston 13, depicted FIGS. 5C–5D, had a head portion 30 with whirlpool recess 46. Whirlpool recess 46 is of particular value in preload valve 1 applications where pressure rises very rapidly in the cushion device cylinder bore 104, e.g., maximum load collisions in railcars at more than about 13 miles per hour. Under the latter conditions, whirlpool recess 46 channels incoming fluid into a pressurized vortex that serves to rapidly and smoothly snap piston 13 down into the open position. Embodiments having the subject piston 13 whirlpool recess 46 (FIGS. 5C–5D) respond more rapidly and smoothly at very high very fast pressure than those having a piston according to FIGS. 3A–D (FIGS. 5A–B). Under less challenging operating conditions (e.g., up to about 10 mph with maximum loads in a railcar) the embodiment of FIG. 3D performs somewhat better than that of FIGS. 3A–B, but at lower speeds and/or lower loads all three embodiments perform somewhat similarly.

In presently preferred embodiments, the predetermined preload pressure value for transitioning from the closed mode to open mode is about 50,000 psi to about 100,000 psi and most preferably about 60,000 psi for a cushion device 100 having a piston 106 diameter of about 8-inches to about 10-inches. Skilled artisans will recognize that alternative embodiments of the instant preload valve may be fabricated with different predetermined preload pressure values, e.g., according to proportional structural modifications suggested by and deriving from Formula I, above.

In regard to preferred conformations of cylinder wall 103 in cushion device 100 (FIG. 1), TABLE 1 (below) discloses dimensions and shapes for machining of aperture 107, cavity 108, and step 111 in presently preferred, and most preferred, embodiments of the invention useful in cushion devices 100 having a cylinder bore (and piston) diameter of about 8 inches to about 10 inches.

TABLE 1

Preferred Cylinder Wall 103 Receptacle Dimensions

| Element | Preferred Shape | Preferred Dimensions (inches)* | | Most Preferred Dimensions (inches)* | |
| --- | --- | --- | --- | --- | --- |
| | | Diameter | Length | Diameter | Length |
| Aperture 107 | cylindrical void | about 5/16 to about 3/8 | about 1/4 to about 7/16 | about 0.349 to about 0.375 | about 0.248 to about 0.252 |
| Cavity 108 | cylindrical void | about 3/4 to about 1 1/2 | about 3/4 to about 7/8 | about 1.115 to about 1.243 | about 0.821 to about 0.816 |
| Step 111 | circular ring with center void | about 5/16 to about 7/16 | NA | about 0.315 to about 0.433 | NA |

*NA, not applicable

TABLE 2 discloses the presently preferred dimensions for a preload valve 1 suitable for installation in a cylinder wall 103 cavity 108 having the dimensions according to TABLE 1 (above).

TABLE 2

Preferred Preload Valve 1 Dimensions

| Componen | Preferred Shape* | Preferred Dimensions (inches)** | | Most Preferred Dimensions (inches)* | |
| --- | --- | --- | --- | --- | --- |
| | | Diameter | Length | Diameter | Length |
| Housing 10 | cylindrical | about 1.115 to about 1.243 | about 0.821 to about 0.816 | about 1.115 to about 1.243 | about 0.957 to about 1.163 |
| Valve Seat Passage 24 | cylindrical void | about 0.349 to about 0.375 | about 0.273 to about 0.281 | about 0.349 to about 0.375 | about 0.273 to about 0.281 |
| Piston head 30 | SID | about 0.800 to about 0.803 | about 0.304 to about 0.307 | about 0.872 to about 0.876 | about 0.356 to about 0.361 |
| Piston cap 32 | cylindrical filled; SID | about 0.361 to about 0.363 | about 0.123 to about 0.127[a] | about 0.333 to about 0.469 | about 0.146 to about 0.149[b] |
| Piston passage 33 | cylindrical void; SID | about 0.062 to about 0.065 | about 0.689 to about 0.692 | about 0.060 to about 0.064 | about 0.675 to about 0.680 |
| Piston rod 31 | cylindrical solid | about 0.336 to about 0.338 | about 0.384 to about 0.389 | about 0.342 to about 0.344 | about 0.333 to about 0.338 |
| Piston biasing chamber 26 | cyl. void; conical apex | about 0.339 to about 0.341 | about 0.397 to about 0.400 | about 0.343 to about 0.347 | about 0.473 to about 0.477 |

TABLE 2-continued

Preferred Preload Valve 1 Dimensions

|  | Preferred | Preferred Dimensions (inches)** | | Most Preferred Dimensions (inches)* | |
|---|---|---|---|---|---|
| Componen | Shape* | Diameter | Length | Diameter | Length |
| Housing body exit passage 25 | round void; SID | about 0.153 to about 0.159 | NA | about 0.320 to about 0.310 | NA |

*SID, complex shape, see accompanying instant disclosure;
**NA, not applicable; (a.) according to FIG. 3D; 5B; (b.) according to FIG. 5C–5D.

The preferred and most preferred embodiments of preload valve 1, having dimensions as disclosed in TABLE 2 (above), is further capable of providing to the cushion device a preload pressure of about 50,000 psi to about 100,000 psi, preferably about 60,000. Additional dimensions are as follows: namely, In the preferred embodiment (FIGS. 3D; 5B), piston head plane portion 34 forms about a 30-degree to about a 32-degree inclined plane, preferably about 30 to about 31-degrees, relative to the flat surface of piston head 30 cap 32. Plane portion 34 starts at about the middle of the radial edge of piston head 30 and extending to piston head cap portion 32. Preferably plane portion 34 starts about 0.155-inches from the base of the piston head and about 0.149-inches from piston cap 32; and, Each of four radial piston head convex passages 36 subscribe an arc of a circle having a radius of about 5/32-inch to about 6/32-inch, preferably a radius of about 0.156 inches and an arc depth of about 0.084 inches (i.e., the maximal depth cut into piston head 30.)

In the most preferred embodiment (FIG. 3D fitted with piston 13 of FIGS. 5C–5D), piston head 30 contains an elevated cap portion 32 and cap wall portion 48 that channels hydraulic fluid under high pressure into whirlpool recess 46. The function of the latter interior curvature of whirlpool recess 46 is to direct hydraulic fluid entering the valve at very high pressures to enter into a whirlpool vortex that is circulating from the interior (i.e., toward the valve centerline) toward the exterior in recess 46. In a preferred embodiment the radius of curvature of the interior wall of recess 46 is about 0.093-inches; the radius of curvature of the exterior wall of recess 46 is about 0.033-inches; and, recess 46 is about 0.211-inches deep, about 0.308-inches to about 0.312-inches wide, and has a exterior diameter of 0.720-inches. In the latter embodiment, cap rim 47 is about 0.154-inches wide and has a tapered edge forming an angle of about 30-degrees relative to the horizontal axis of piston 13.

Each of eight radial piston head convex passages 36 subscribe an arc of a circle having a radius of about 5/32-inch to about 6/32-inch, preferably a radius of about 0.156 inches and an arc depth of about 0.107-inches to about 0.110-inches (i.e., the maximal depth cut into piston head 30.)

In the both the preferred and most preferred embodiments, piston biasing chamber most preferably is polished to a #16 (or better) finish. Spring orifice 22 is preferably a cylindrical void making up an internal cavity area of about 0.515 cubic inches. Interior housing wall 20 is preferably polished to a #16 (or better) finish. Helical compression spring is preferably about 5/8 inches in length, preferably about 0.627-inches to about 0.633-inches, most preferably about 0.630-inches; has a diameter of about 11/16-inch, preferably about 0.683-inches to about 0.689-inches, most preferably about 0.686-inches; has a bore of about 0.521-inches; has a maximum deflection of about 0.180-inches; has a maximum load of about 28 pounds; is made up of four coils each having a diameter of about 0.082-inches; and, e.g. of a heat treated stainless steel.

The following general relationships set forth in TABLE 3, below, serve as benchmarks in machining of preload valves having different predetermined preset pressure preload values, supra.

TABLE 3

Alternative Preload Valve 1 Benchmarks

Preferred Dimensions and Enclosed Hydraulic Fluid Volumes

| Component or Chamber | Radius (inches) | Height (inches) | Volume (cubic inches) | Preferred Volume as Percentage of Housing Interior Volume (%)* |
|---|---|---|---|---|
| Housing 10 interior cavity[a] | about 0.404 to about 0.405 | about 0.629 to about 0.639 | about 0.418 to about 0.423 | 100 |
| Head cavity 21 | SID | SID | about 0.032 | about 7.6 to about 7.7 |
| Spring orifice 22[a,b] | SID | about 0.473 to about 0.477 | about 0.283 to about 0.288 | about 67 to about 69 |
| Dashpot 26[c] | about 0.170 to about 0.171 | about 0.399 to about 0.479 | about 0.029 | about 6.8 to about 6.9 |
| Piston passage 33 | about 0.031 | about 0.689 | about 0.002 | about 0.47 to about 0.5 |
| Piston 13 | SID | SID | about 0.058 | about 13.6 to about 13.8 |
| Spring 14 | SID | SID | about 0.007 | about 1.7 |

TABLE 3-continued

Alternative Preload Valve 1 Benchmarks

Preferred Dimensions and Enclosed Hydraulic Fluid Volumes

| Component or Chamber | Radius (inches) | Height (inches) | Volume (cubic inches) | Preferred Volume as Percentage of Housing Interior Volume (%)* |
|---|---|---|---|---|
| Piston head 30 | SID | SID | about 0.042 | about 9.8 to about 10 |
| Piston rod 31 | about 0.116 | about 0.385 | about 0.016 | about 3.8 |

*SID, complex shape, see accompanying instant disclosure; a) volume available to fluid, i.e., with volume occupied by piston subtracted; b.) volume available to fluid, i.e., with spring volume subtracted; c.) volume available to fluid when valve in closed mode, i.e., piston rod volume subtracted.

The guidelines in TABLE 3 direct that a preload valve according to the invention will have a piston head cavity 21 that, when in the closed mode (supra), is less than about 7.6–7.7% of the total interior volume of housing 10 that is accessible to hydraulic fluid ($V_{10}$); a spring orifice cavity 22 cavity that is about 67–69% of $V_{10}$ when the valve is in a closed mode(supra; exclusive of volume in exit passages 25); a piston rod receiving chamber/dashpot 26 that, (subtracting out space occupied by piston rod 31, has a dashpot cavity that is about 6.8–6.9% of $V_{10}$; a piston passage 33 that accomplishes hydraulic biasing means and is about 0.47–0.5% of $V_{10}$; a piston 13 that occupies a total volume that is about 13.6–13.8% of $V_{10}$; a piston head portion 30 that occupies a volume that is about 9.8–10% of $V_{10}$; and a piston rod portion 31 that occupies a volume that is about 3.8% of $V_{10}$.

The guidelines in TABLE 4 direct that a preload valve according to the invention will have a fluid entry passage 24 that is about 19% of the total interior housing 10 cross-sectional area ($XSA_{10}$); a piston cap portion 32 sealing the entry that is about 20% of $XSA_{10}$; several (most preferably four) piston head passages 36 that, when in open mode, allow passage of fluid and have a combined (additive) cross-sectional area that is about 30% of $XSA_{10}$; a piston passage 33 that accomplishes hydraulic biasing means and is about 0.6% of $XSA_{10}$; a spring orifice 22 chamber allowing flow of hydraulic fluid toward an exit, and having a cross-sectional area that is about 66% of $XSA_{10}$ (exclusive of exit passages 25); and, exit passages 25 for fluid that is at least about 23% of $XSA_{10}$.

TABLE 4

Alternative Preload Valve 1 System* Benchmarks: Preferred Preload Valve 1 Cross-Sectional Areas as a Percentage of the Total Cross-Sectional Area in Preload Valve Housing 10

| Component | Radius (inches)* | Cross-Sectional Area (sq. inches) | Percentage (%) |
|---|---|---|---|
| Interior Housing 10 | 0.201 | 0.507 | 100 |
| Seat entry passage 24 | 0.175 | 0.96 | 19 |
| Piston cap portion 32 | 0.181 | 0.103 | 20 |
| Piston head convex passage 36 | 0.156 | 4*(½*(0.076)) = 0.152 | 30 |
| Piston passage 33 | 0.031 | 0.003 | 0.6 |
| Spring Orifice 22 | SID | 0.334 | 66 |
| Exit passage 25 | about 0.078 to about 0.151 (SID) | 6(0.019) = 0.115 6(.072) = 0.429 | 23 NA** |

*SID, complex shape, see accompanying instant disclosure;
NA**, in relation to most preferred embodiment of FIG. 3C–3E not applicable, i.e., complex shape; exit passage not included in calculation of total cross-sectional area.

TABLE 5

Alternative Preload Valve 1 System* Benchmarks: Preferred Preload Valve 1
Interior Chamber Volumes as a Percentage of Cushion Device 100 Bore 104 Volume Preferred Dimensions and Enclosed Hydraulic Fluid Volumes

| Component or Chamber | Radius (inches) | Height (inches) | Fluid Volume* (cubic inches) | Percentage (%)* |
|---|---|---|---|---|
| Cylinder Bore 104 | about 4 to about 5 | about 10 | about 502 to about 785 | 100 |
| Housing 10 interior cavity | about 0.404 to about 0.405 | about 0.621 to about 0.629 | 11(0.418 − 0.423) = about 4.6 to about 4.7 | about 0.59 to about 0.94 |
| Head cavity 21 | about 0.404 to about 0.405 | SID | about 11 × (0.032) = 0.352 | about 0.04 to about 0.07 |
| Spring orifice 22 | SID | about 0.473 to about 0.477 | 11 × (0.283 to 0.288) = about 3.11 to 3.17 | about 0.4 to about 0.63 |
| Dashpot 26 | about 0.170 to about 0.171 | about 0.473 to about 0.477 | about 11(0.029) = 0.319 | about 0.04 to about 0.06 |
| Piston passage 33 | about 0.031 | about 0.689 | about 11(0.002) = 0.002 | about 0.003 to about 0.004 |

*System, a preload valving system according to this illustration includes eleven individual preload valves - according to TABLE 3-4, above - and installed within cylinder wall 103 of single cushion device system 100;
**SID, complex shape, see accompanying instant disclosure.

As an example of how TABLES 3–5 may be used as benchmarks according to the instant disclosure, a cushion device having a piston diameter of 15-inches and stroke of 10-inches would have a cylinder bore 104 with a volume of 1766 cubic inches according solution of the formula for a cylinder: namely, $$V = \pi r^2 h \qquad \text{[Formula III]}$$

wherein "r" is the radius of piston 106, "h" is the stroke of the piston in cylinder bore 104 and "V" is the volume of fluid being displace through the instant preload valving system. Accordingly, the total housing 10 volume needed to accomplish a preload value of about 50,000 to 100,000 in the 15-inch diameter cushion device would be about 0.59% to 0.94% (TABLE 5) of 1766 cubic inches, or about 10.4 to about 16.6 cubic inches. If each individual preload valve 1 encloses (within its housing 10) a volume of 0.418 cubic inches to 0.423 cubic inches (TABLES 3–5) then a total of about 25 to about 40 individual preload valves 1 would be required to constitute a preload valving system if each valve had a diameter of about 1 inch. Proportionately increasing the size of all the components (according to TABLES 1–5) of the valve to a preload valve 10 having an overall diameter of about 2-inches would reduce the number of required valves by a factor of two, i.e., about 13 to about 20 valves would constitute a preload valving system for the illustrative 15-inch cushion device. However, it should be noted that when comparing a 10-inch cushion device with a 15-inch, the 15-inch unit will develop about 67% of the hydraulic pressure at the same collision speed as a 10-inch unit (e.g., according to Formula I, above). Thus, a preload valving system for a 15-inch unit that will reasonably mimic the collision test performance of a 10-inch unit and will consist of: 67% of 25–40 valves, or 17–27 individual valves. Each of the individual valves in the subject preload valving system will have internal components with interior fluid volume spaces according to TABLE 3 and cross-sectional areas disclosed in TABLE 4 (and accompanying disclosure), and subassembly components occupying volumes as disclosed in TABLE 5 (and disclosure supra).

While the preferred embodiment of the invention has been illustrated and described, it will be appreciated that various changes can be made therein without departing from the spirit and scope of the invention.

I claim:

1. A preload valve for a rail car cushion device, the preload valve having an open mode and a closed mode wherein said preload valve in said open mode is capable of allowing a hydraulic fluid to flow through the preload valve, the preload valve comprising:

a housing having an interior housing wall, a valve seat having a seat passage, a dashpot having a dashpot cylindrical wall portion; and an exit passage;

a valve piston having a head portion and rod portion, wherein said head portion is slideably retained against the interior housing wall, said rod portion is sealed within and slideably retained within the dashpot cylinder wall, said head portion is capable of engaging and sealing said valve seat passage when said preload valve is in the closed mode, and said head portion further comprises a plurality of passage portions capable of allowing the hydraulic fluid to flow from the valve seat passage to the exit passage when the preload valve is in the open mode;

a piston passage through the head portion and the rod portion of the valve piston, wherein the piston passage is capable of allowing fluid communication between the seat passage and the dashpot when the valve is in the open or the closed mode to thereby hydraulically bias the valve piston towards the valve seat;

wherein in the closed mode the head portion of the piston obstructs the seat passage preventing flow of hydraulic fluid from the seat passage into the preload valve housing;

wherein in the open mode the passage portions of the head portion allow hydraulic fluid to flow through the preload valve housing to the exit passage.

2. The preload valve of claim 1, wherein said preload valve is capable of transitioning from the closed mode to the open mode at a preset hydraulic pressure of the hydraulic fluid at the seat passage relative to the exit passage.

3. The preload valve of claim 2, wherein the preset hydraulic pressure is about 50,000 pounds per square inch to about 100,000 pounds per square inch.

4. The preload valve of claim 2 further comprising a spring for biasing the valve piston towards the piston seat to thereby return the preload valve to the closed mode.

5. The preload valve of claim 4, wherein the spring provides a bias force of about 28 pounds, and the preset hydraulic pressure is about 50,000 pounds per square inch to about 100,000 pounds per square inch.

6. The preload valve of claim 1, wherein the head portion of the valve piston further comprises an inclined plane portion making an angle of about 30 to about 32 degrees with the horizontal axis of said piston, and engaging against an interior opening of the seat passage when the preload valve is in the closed mode.

7. The preload valve of claim 1 the housing has a housing interior volume, said housing interior volume comprising:

a piston head cavity having a fluid volume that is about 7.6 percent to about 7.7 percent of said housing interior volume;

a spring orifice having a fluid volume that is about 67 percent to about 69 percent of said housing interior volume;

the dashpot having a fluid volume that is about 6.8 percent to about 6.9 percent of said housing interior volume;

the piston passage having a fluid volume that is about 0.47 percent to about 0.5 percent of said housing interior volume; and the valve piston occupying a volume that is about 13.6 percent to about 13.8 percent of said housing interior volume.

8. A preload valving system for a cushion device, said cushion device having a casing that encloses a piston and a cylinder having a cylinder wall with a plurality of apertures, the system comprising a plurality of preload valves according to claim 1, each of said preload valves being mounted in a different aperture in a different position in said cylinder wall of said cushion device.

9. A method for manufacturing an original equipment railcar cushion device, said cushion device having a casing that encloses a piston and a cylinder having a cylinder wall with a plurality of apertures, the method comprising the step of mounting a preload valve according to claim 1 in at least one of said apertures in said cylinder wall of said original equipment cushion device.

10. A method for rebuilding a used rail car cushion device, said cushion device having a casing that encloses a piston and a cylinder having a cylinder wall with a plurality of apertures, the method comprising the step of mounting a preload valve according to claim 1 in at least one of said apertures in said cylinder wall of said used rail car cushion device.

11. An improved hydraulic cushion device for a railcar, said device having a cylinder wall, a piston, a casing and a plurality of apertures, the improvement comprising a preload valve according to claim 1 installed in at least one of said apertures, wherein said preload valve is capable of releasing a hydraulic pressure at a preset hydraulic pressure without valve chatter.

12. The preload valve of claim 1, wherein the passage portions of the head portion of the valve piston comprise a plurality of radially oriented convex passages.

13. The preload valve of claim 1, wherein the head portion of the valve piston has a recess portion for channeling hydraulic fluid entering through the seat passage into a pressurized vortex between the head portion and the valve seat to thereby create a rapid and smooth transition from the closed mode to the open mode of the preload valve.

14. The preload valve of claim 1 further comprising a plurality of exit passages for directing the hydraulic fluid to exit the preload valve in a direction oriented along a longitudinal axis of the preload valve, the exit passage being one of said plurality of exit passages.

15. The preload valve of claim 1 further comprising a plurality of exit passages for directing the hydraulic fluid to exit the preload valve in a direction oriented at an acute angle to a longitudinal axis of the preload valve, the exit passage being one of said plurality of exit passages.

16. A valve for preloading a hydraulic impact cushioning device having a piston slidingly received within a cylinder, the cylinder having a plurality of apertures for controlling the flow of hydraulic fluid out of the cylinder when an impact force is applied to the piston, the valve comprising:

a valve body having an inlet, an outlet and a flow passage extending between the inlet and outlet;

a valve seat within the flow passage;

a valve control element moveable between a valve closed position and valve open position, the valve control element seating against the valve seat in the valve closed position to obstruct fluid flow through the flow passage;

a hydraulic valve biasing cylinder having a chamber;

a bias passage for providing fluid communication between a volume of hydraulic fluid at the inlet and the chamber of the valve biasing cylinder;

an actuator element slidingly engaging in the valve biasing cylinder and actuating the valve control element such that hydraulic fluid pressure in the chamber acts on the actuator element to cause the actuator element to urge the valve control element towards the valve closed position; and the valve body being mountable in a selected one of the apertures in the impact cushioning device's cylinder so as to preload the impact cushioning device.

17. The valve of claim 16 further comprising a spring for biasing the valve control element towards the valve closed position.

18. The valve of claim 16 further comprising:

a slide member slidingly received in the flow passage and having one end forming the valve control element and another end forming the actuator element.

19. The valve of claim 16 wherein the slide member has a plurality of recesses for permitting fluid flow around the slide member when the valve actuator element is in the valve open position.

20. The valve of claim 16 wherein the bias passage extends through the slide member.

21. The valve of claim 16 further comprising an interference surface on the valve control element that in combination with the valve seat and flow passage when the valve control element is in the valve open position defines a vortex chamber between the valve control element and the valve seat for causing fluid flow through the flow passage to form a pressurized vortex in the vortex chamber whereby the valve control element rapidly and smoothly transitions to the valve open position when pressure at the inlet rises above a threshold.

22. The valve of claim 21 wherein the valve control element is slidingly received in the flow passage and has a plurality of recesses for permitting fluid flow around the valve control element, the recesses having an additive cross-sectional area with a relationship to the cross-sectional area of the inlet such that the interference surface can cause the pressurized vortex to form in the vortex chamber.

23. A valve for preloading a hydraulic impact cushioning device having a piston slidingly received within a cylinder, the cylinder having a plurality of apertures for controlling the flow of hydraulic fluid out of the cylinder when an impact force is applied to the piston, the valve comprising:

a valve body having an inlet, an outlet and a flow passage extending between the inlet and outlet;

a valve seat within the flow passage;

a valve control element slidingly received within the flow passage and moveable between a valve closed position and valve open position, the valve control element seating against the valve seat in the valve closed position to obstruct fluid flow through the flow passage;

a biasing means for urging the valve control element towards the valve closed position; and a concave interference surface on the valve control element that in combination with the valve seat and flow passage defines a vortex chamber between the valve control element and the valve seat when the valve control element is in the valve open position for causing fluid flow through the flow passage to form a pressurized vortex in the vortex chamber whereby the valve control element rapidly and smoothly transitions to the valve open position when pressure at the inlet rises above a threshold.

24. A railcar cushion device comprising a casing, a cylinder with the casing, a circumferential annular space between the casing and the cylinder, said cylinder further comprising a cylinder wall enclosing a cylinder bore capable of slidably retaining a piston and a hydraulic fluid under a pressure, a plurality of apertures in said cylinder wall, and a valving means mounted within said cylinder wall apertures, said valving means comprising a plurality of pilot-controlled relief sequence (PCRS) valves mounted within said plurality of cylinder wall apertures and each of said plurality of PCRS valves having an open mode and a closed mode, wherein said open mode comprises a valve position in which said hydraulic fluid can flow from said cylinder bore through said PCRS valve into said circumferential annular space, and wherein said closed mode comprises the valve position in which said PCRS valve prevents said flow of said hydraulic fluid; and each of said plurality of PCRS valves comprising:

a housing mountable in a respective one of said plurality of apertures and said housing comprising means for retaining a valve seat having a valve seat passage capable of fluid communication with said respective aperture; a dashpot for slidably retaining a valve piston; and said housing further comprising a plurality of exit passages in fluid communication with said circumferential annular space;

said valve piston comprising a piston head capable of reversibly engaging and sealing said valve seat passage, and said piston head further comprising a plurality of radially oriented convex passage portions capable of allowing said hydraulic fluid to flow from the valve seat passage to said plurality of exit passages when said PCRS valve is in said open mode;

and a hydraulic pilot cylinder biasing means capable of forcing said valve piston head against said valve seat, said hydraulic pilot cylinder biasing means further comprising a piston passage through said piston head and into said dashpot, and wherein said piston passage is in fluid communication with said cushion device cylinder bore when the PCRS valve is in either of the open or the closed mode;

said closed mode comprising said PCRS valve position wherein said valve piston head is hydraulically biased against said valve seat obstructing the flow of hydraulic fluid;

said open mode comprising said PCRS valve position wherein said valve piston head is not hydraulically biased against said valve seat and the hydraulic fluid can flow through said piston head radially oriented convex portions into said plurality of exit passages.

25. The railcar cushion device of claim 24, wherein each of said plurality of PCRS valves comprises a collision duty cycle in which said PCRS valve transitions from said closed mode to said open mode at a first preset hydraulic pressure of said hydraulic fluid in said cylinder bore of said cushion device.

26. The railcar cushion device of claim 25, wherein said collision duty cycle comprises transitioning from said closed mode to said open mode at a force in the range of about 50,000 pounds to about 100,000 pounds.

27. The railcar cushion device of claim 24, wherein said PCRS valve housing comprises a diameter of about ¾ inch to about 1½ inch.

28. The rail car cushion device of claim 24, wherein said PCRS valve hydraulic pilot cylinder piston passage comprises a cylindrical channel having a cross-sectional area about 3% to about 5% of the cross-sectional area of said valve seat passage.

29. The rail car cushion device of claim 24, wherein said PCRS valve seat passage comprises a circular cross-sectional area of about 0.096 square inches to about 0.111 square inches.

30. The rail car cushion device of claim 24, wherein said PCRS valve piston head comprises a diameter of about 0.800 inches to about 0.876 inches and the number of said piston head convex passage portions comprises an integer selected from within the range of four to eight.

31. The cushion device of claim 24, further comprising about 9 to 15 PCRS valves, each of said PCRS valves being mounted in different ones of said apertures in said cylinder wall of said cushion device.

* * * * *

UNITED STATES PATENT AND TRADEMARK OFFICE
CERTIFICATE OF CORRECTION

PATENT NO. : 5,871,109
DATED : February 16, 1999
INVENTOR(S) : Litten

It is certified that error appears in the above-identified patent and that said Letters Patent is hereby corrected as shown below:

| Col./Line | | Should Read |
|---|---|---|
| 14/32 | 5/16to | 5/16 to |
| 14/32 | 1/4to | 1/4 to |
| 14/34 | 3/4to | 3/4 to |
| 14/34 | 3/4to | 3/4 to |
| 14/35 | 5/16to | 5/16 to |
| 19/20 | 0.002 | 0.022 |
| 20/33 | portion; | portion, |
| 22/46 | claim 16 | claim 18 |

Signed and Sealed this

Eighteenth Day of January, 2000

Attest:

Attesting Officer

Q. TODD DICKINSON

Commissioner of Patents and Trademarks